(12) United States Patent
Motew et al.

(10) Patent No.: US 7,399,002 B2
(45) Date of Patent: Jul. 15, 2008

(54) CRYOGENIC SEAL FOR VACUUM-INSULATED PIPE EXPANSION BELLOWS

(75) Inventors: Stuart Motew, The Woodlands, TX (US); David McWilliams, The Woodlands, TX (US); Douglas Ducote, The Woodlands, TX (US); William Middleton, Houston, TX (US); John Bonn, Hilliard, OH (US)

(73) Assignee: Chart Industries, Inc., Garfield Heights, OH (US)

( * ) Notice: Subject to any disclaimer, the term of this patent is extended or adjusted under 35 U.S.C. 154(b) by 189 days.

(21) Appl. No.: 11/185,096

(22) Filed: Jul. 20, 2005
(Under 37 CFR 1.47)

(65) Prior Publication Data
US 2006/0175828 A1 Aug. 10, 2006

Related U.S. Application Data

(60) Provisional application No. 60/589,449, filed on Jul. 20, 2004.

(51) Int. Cl.
*F16L 7/00* (2006.01)
(52) U.S. Cl. .................. 285/123.3; 285/904; 285/145.5
(58) Field of Classification Search .............. 285/123.3, 285/904, 145.5, 226
See application file for complete search history.

(56) References Cited

U.S. PATENT DOCUMENTS

| | | | | |
|---|---|---|---|---|
| 2,185,450 | A | * | 1/1940 | Wager ...................... 285/142.1 |
| 3,885,595 | A | * | 5/1975 | Gibson et al. ............... 138/155 |
| 4,515,397 | A | | 5/1985 | Nowobilski et al. |
| 6,533,334 | B1 | * | 3/2003 | Bonn ....................... 285/145.5 |
| 6,695,358 | B2 | * | 2/2004 | Bonn .......................... 285/13 |
| 7,137,651 | B2 | * | 11/2006 | Bonn ....................... 285/123.5 |

\* cited by examiner

*Primary Examiner*—David E Bochna
(74) *Attorney, Agent, or Firm*—DLA Piper US LLP; R. Blake Johnston

(57) ABSTRACT

A cryogenic seal for vacuum-insulated pipe systems where the pipe system includes an inner pipe connected to an outer pipe by a bellows. The seal prevents cryogenic liquid from leaking from the inner pipe into the annular vacuum space between the inner and outer pipes in the event of bellows failure. One end of the bellows is connected to the inner pipe by a movable bellows ring and the other end of the bellows is attached to the outer pipe by a fixed bellows ring. A bellows guide is attached to the fixed bellows ring and receives the movable bellows ring in a sliding fashion. The seal may be positioned between the movable bellows ring and the bellows guide or between the fixed bellows ring and the outer surface of the inner pipe. The seal may also be positioned between the bellows shield and the movable bellows ring. The seal may be a leak control ring or the packed gland type.

14 Claims, 7 Drawing Sheets

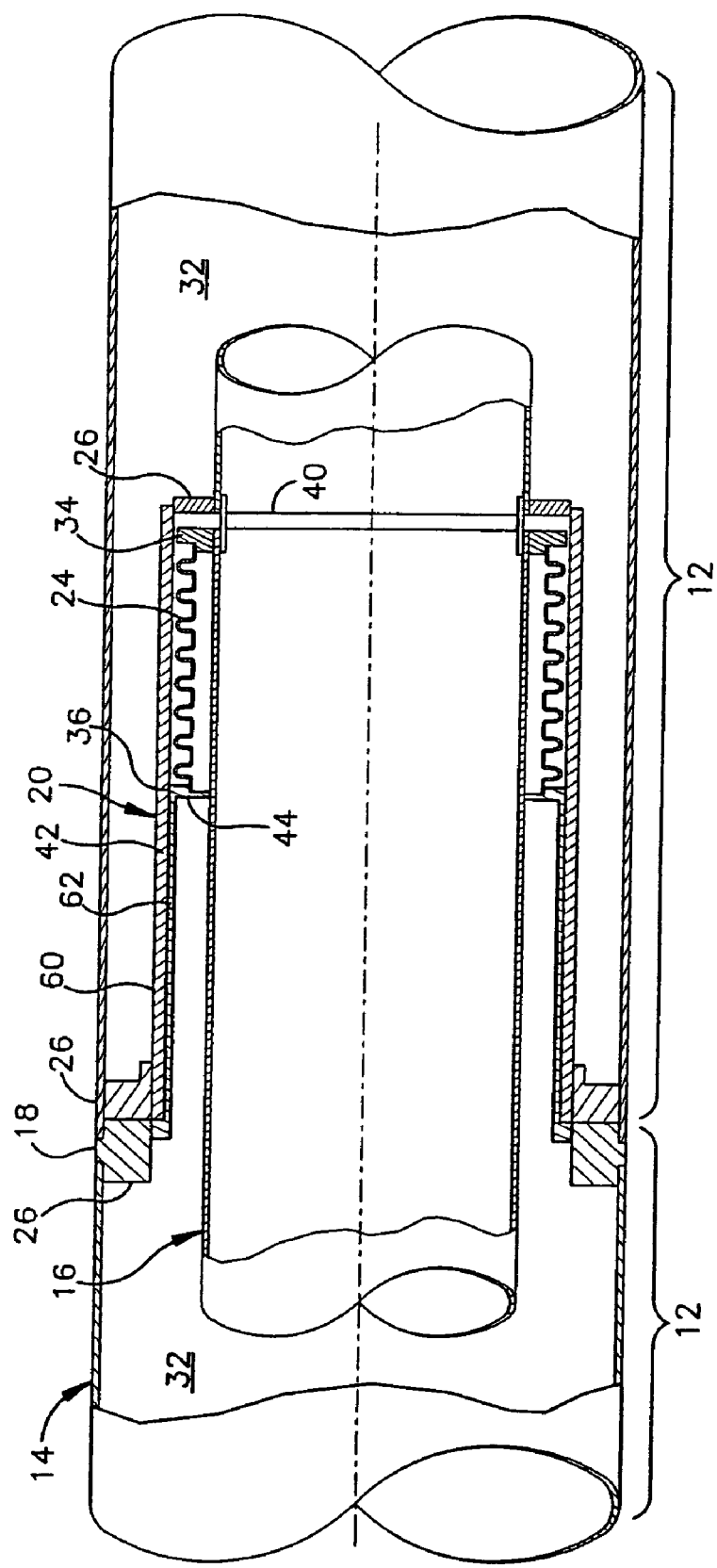

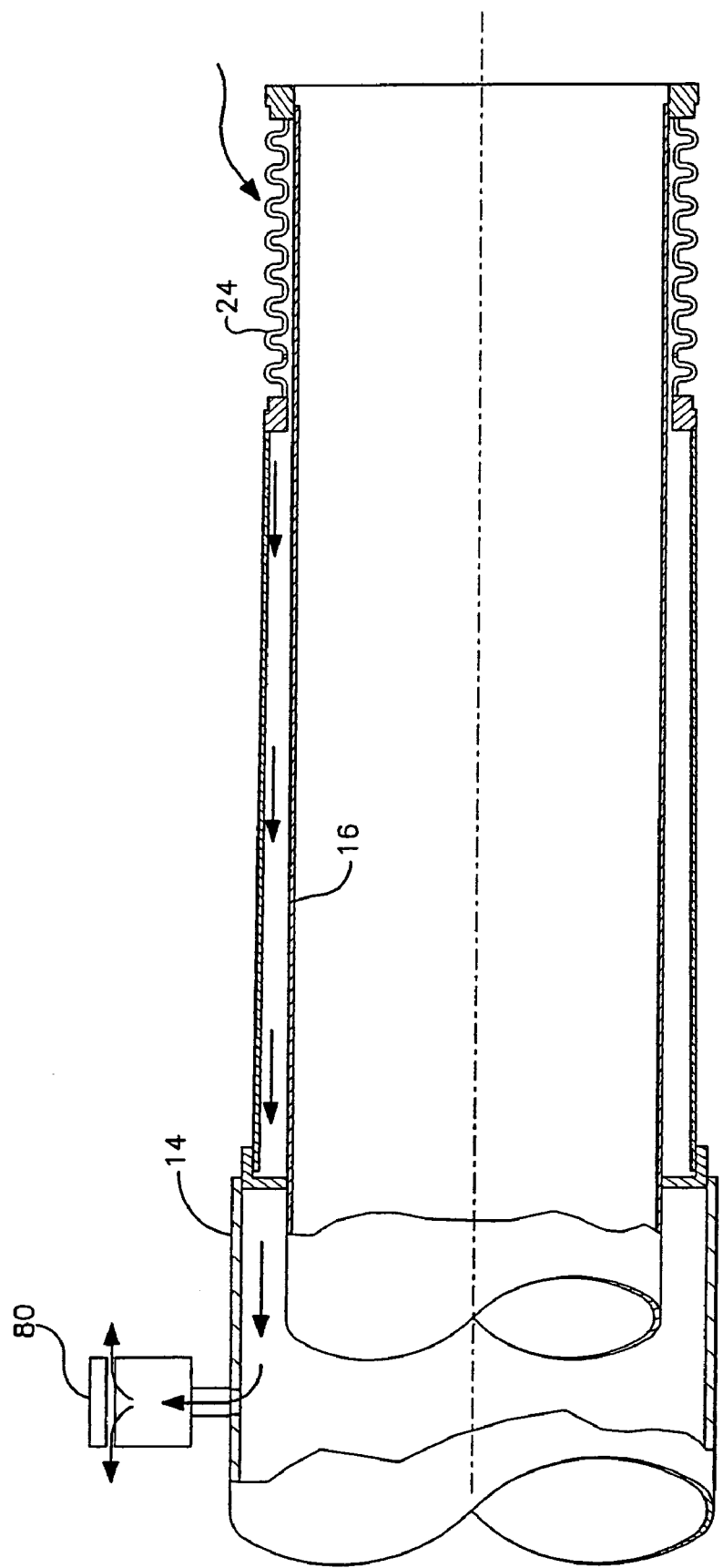

US 7,399,002 B2

CRYOGENIC SEAL FOR VACUUM-INSULATED PIPE EXPANSION BELLOWS

CLAIM OF PRIORITY

This application claims priority from U.S. Provisional Patent Application No. 60/589,449 filed Jul. 20, 2004.

BACKGROUND

The invention relates generally to insulated piping and, in particular, to a cryogenic seal for a vacuum-insulated pipe expansion bellows.

Thermally insulated pipes have a wide variety of industrial applications. For example, insulated piping is used to transport cryogenic liquids, that is, liquids having a boiling point at a temperature below −150° F. at atmospheric pressure, between storage tanks or between a storage tank and a use device. Other examples include utilization in chemical plants or petroleum refining.

A major source of thermal leakage in insulated pipe systems is at the junction between two pipe sections. It is therefore preferable to eliminate such pipe joints. This would require, however, that the insulating piping be custom-manufactured to fulfill the length requirements of specific applications. Such an arrangement would be prohibitively expensive. As a result, efforts have been directed towards developing prefabricated insulated pipe sections that may be connected with joints that suffer from minimal thermal leakage. An appropriate number of such sections may be delivered and joined in the field to create efficient piping systems of desired lengths.

One type of prefabricated pipe features vacuum-insulated sections. This system is offered by Chart Industries, Inc. of Garfield Heights, Ohio under the name VIP. A VIP pipe section is constructed of an inner pipe surrounded by an outer pipe. The inner pipe and outer pipe are concentrically positioned so that an annular insulation space is formed therebetween. The ends of the outer pipe are welded to the inner pipe so that the annular space is sealed. Either the inner pipe or the outer pipe is provided with a bellows so that the integrity of the welds is preserved when the pipes expand or contract by differing amounts due to temperature changes.

The insulation space of the VIP pipe is evacuated and filled with a multiplicity of layers of thin fabric formed of fine fibers of glass, cellulose or other fibrous material characterized by low heat conductivity. Positioned between the thin fabric layers are reflective barrier sheets formed of highly reflective material, such as an aluminum foil. When utilized in cryogenic liquid applications, the insulation arrangement of VIP pipe minimizes conduction and radiation heat gain to the cryogen within the inner pipes.

VIP pipe sections may be connected by brazing or buttwelding with the joints covered by insulated clam shells. VIP pipe sections, however, are optimally joined by a bayonet connector arrangement such as is disclosed in U.S. Pat. No. 4,491,347 to Gustafson. The '347 patent discloses pipe sections that have interfitting metal male and female end portions. The material of the female portion has a coefficient of expansion that is greater than that of the male portion. As a result, when cryogenic liquid flows through the pipe sections, the female portion contracts into sealing relationship with the male portion.

Vacuum-insulated pipe such as the VIP offer high performance with an overall heat loss of only 160 BTU/hr for 100 feet of 1 inch pipe when liquid nitrogen is carried. In addition, vacuum-insulated pipes such as the VIP typically retain their original insulating capabilities for fifteen to twenty years.

A disadvantage associated with existing vacuum-insulated piping is that failures of the bellows of the piping can cause cryogenic material to leak from within the inside pipe into the vacuum area between the inner and outer pipes. Vaporization of the leaked liquid cryogenic material and the cooling effects of the cryogenic material on the outer pipe can create a situation where other parts of the pipe spool system may fail catastrophically. Additionally, leakage of cryogenic material from the inside pipe results in safety concerns and the loss of saleable product. It is therefore desirable to provide a cryogenic seal for vacuum-insulated pipes that eliminates or minimizes such leakage.

SUMMARY OF THE INVENTION

The present invention is a cryogenic seal for vacuum-insulated piping expansion bellows systems. More specifically, the piping system includes an inner pipe through which cryogenic liquid flows and an outer pipe at least partially surrounding the inner pipe. A movable bellows ring connects the first end of a bellows to the inner pipe while a first fixed bellows ring connects the second end of the bellows to the outer pipe. A bellows guide is connected by a first end to the first fixed bellows ring and receives the movable bellows ring in a sliding fashion. In accordance with the present invention, a seal is positioned between the inner pipe and the bellows guide so that, in the event of bellows failure, liquid leaked from the inner pipe does not travel out from between the bellows guide and the inner pipe into an annular space between the inner pipe and the outer pipe. The seal may optionally be incorporated into a bayoneted piping system including a male bayonet connector featuring the bellows, the movable bellows ring and the first fixed bellows ring and a female bayonet connector featuring the bellows guide.

The seal may be positioned between the movable bellows ring and the bellows guide and may include a leak control ring. Alternatively, the seal may feature at least one packing layer which may contain a carbon and/or graphite-based packing material. A retaining ring is positioned on the movable bellows ring and adjacent to the at least one packing layer. Alternatively, the seal may be positioned between the first fixed bellows ring and an outer surface of the inner pipe. A third location for the seal is between the movable bellows ring and a bellows shield. In addition, seals may be positioned in multiple places simultaneously, such as between the movable bellows ring and the bellows guide and between the first fixed bellows ring and an outer surface of the inner pipe.

The following detailed description of embodiments of the invention, taken in conjunction with the appended claims and accompanying drawings provide a more complete understanding of the invention.

BRIEF DESCRIPTION OF THE DRAWINGS

FIG. 3 is an enlarged, detailed sectional view of an assembled connector of FIG. 1A;

FIG. 6 is a schematic sectional view of a pipe spool with pressure relief valve suitable for use with the present invention;

DETAILED DESCRIPTION OF THE PREFERRED EMBODIMENTS

Figure 1A:
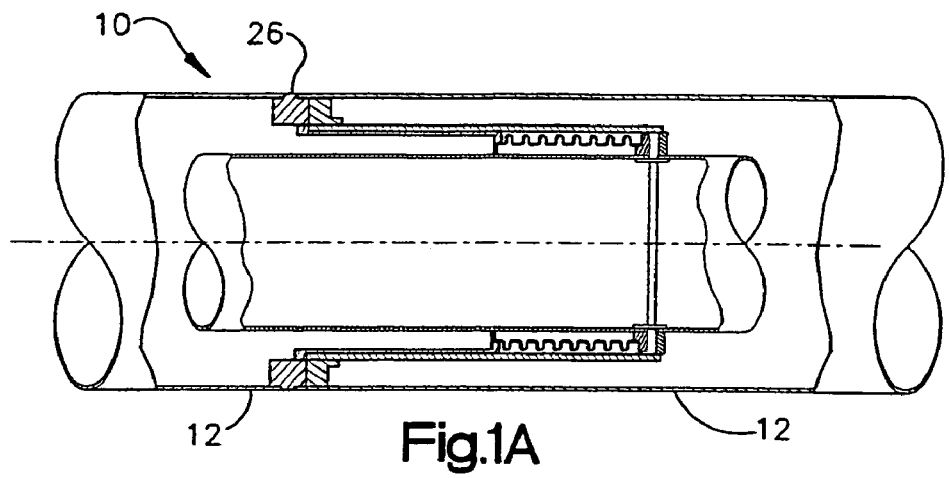
FIGS. 1A, B, and C are schematic sectional views of three types of assembled bayonet connectors with pipe spools featuring male bayonet ends that may constructed in accordance with the present invention.
Figure 1B:
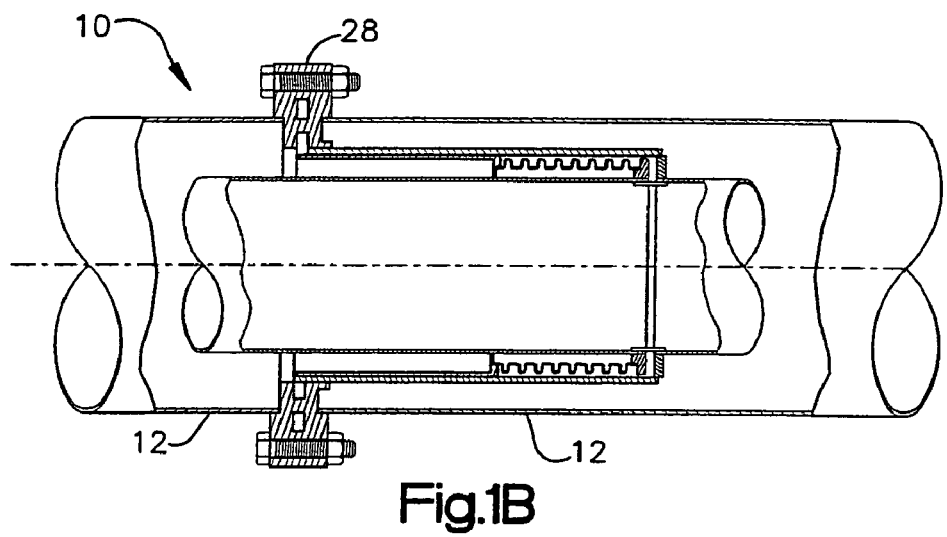
Figure 1C:
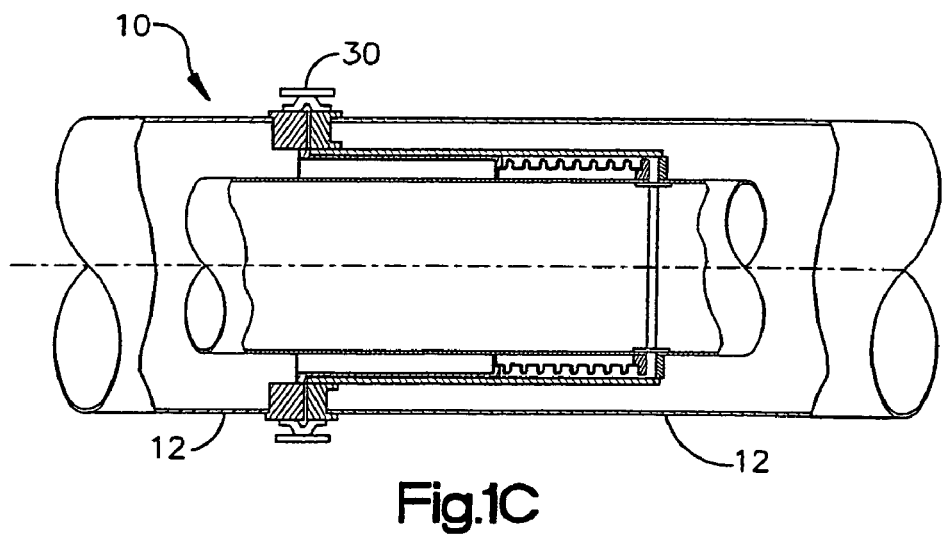

The cryogenic seal of the present invention may incorporated into a pipe spool having a male bayonet end or a pipe spool without a bayonet end. In relation to the former, FIG. 1 shows three sectional views, A, B, and C, of coupled, cryogenic, pipe spool connectors together forming a coupled, pipe spool system 10 comprised of mating ends of separate pipe spools 12. FIG. 1 illustrates various joints, or means to connect the ends of engaged, male-female pipe spools 12 to include, but not be limited to: FIG. 1A, a welded bayonet assembly 26 wherein the pipe spools 12 have mating standoff ring closures at each open end with a butt weld construction. FIG. 1B illustrates a flanged bayonet assembly 28 of a standoff ring closure at each pipe spool 12 and with a bolt or thread flange connection 28. FIG. 1C illustrates a clamped bayonet assembly 30 for the coupled pipe spools 12 with a standoff ring closure with a ring clamp as the connector.

Figure 2:
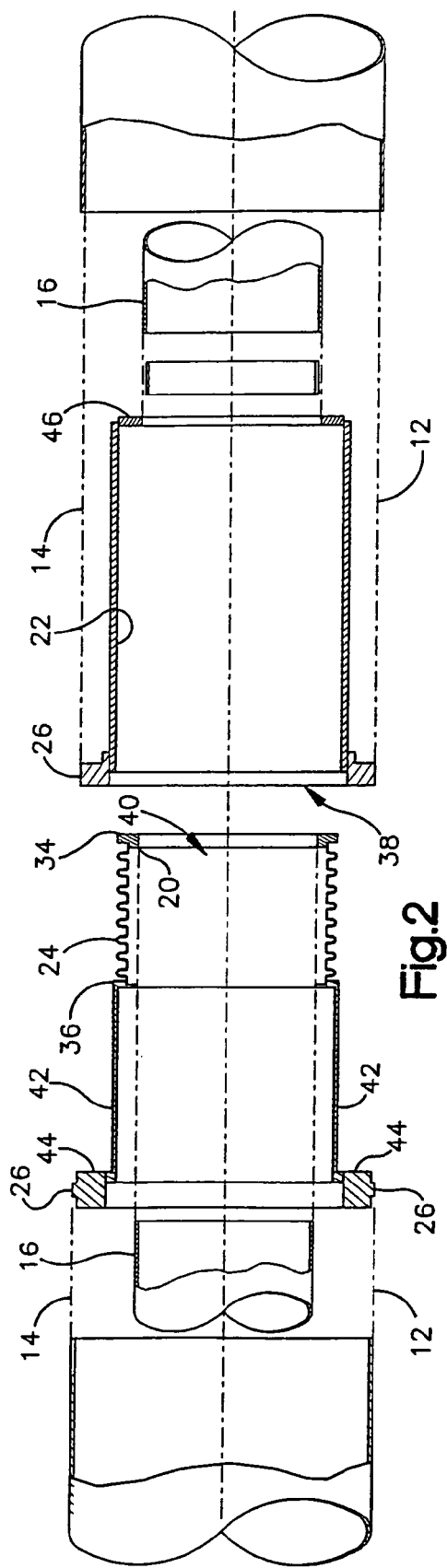
FIG. 2 is an exploded, sectional assembly view of one embodiment of the connector of FIG. 1A.

With reference to FIGS. 2 and 3, there are shown two aligned, opposing, end pipe spools 12 with an outer pipe 14 and an inner pipe 16, and a bayonet joint for the inner pipe 16 including a male bayonet 20 and a female bayonet 22, with an end of defined depth 46, and with an internal sealing surface 60. The male bayonet 20 includes a peripheral, metal, expansion-contraction bellows 24 secured at the one, outer step-down end of the open, male, inner pipe section 40 with flange 34. A concentric pipe 42, which forms the external, male, sealing-mating surface 62 of the male bayonet 20, with an inner flange 44 secured along a selected length of the male bayonet 20 and upstream of the bellows 24. The inner end of the bellows 24 is secured to the inner bellows flange 36 of the step-up concentric pipe 42. The bellows allows thermal contraction or expansion of the inner pipe 16 based on the cryogenic fluid temperature, without imposing stresses on the piping system, and eliminates the need to incorporate large expansion loops in long runs of cryogenic fluid piping.

With reference to FIG. 3, the inner pipe 16 and outer pipe 14 in the coupled position form a jacket vacuum 32 between the coupled pipe spools 12. The bellows 24 forms a bellows space forward of the male bayonet, external mating surface 62. FIG. 3 shows the coupled pipe spools 12 in an overlapping, butt weld connection 26 in the use position (see FIG. 1A also). At all times, an overlapping connection is required to assure a zero tolerance fit between sealing surfaces 60 and 62.

Figure 4:
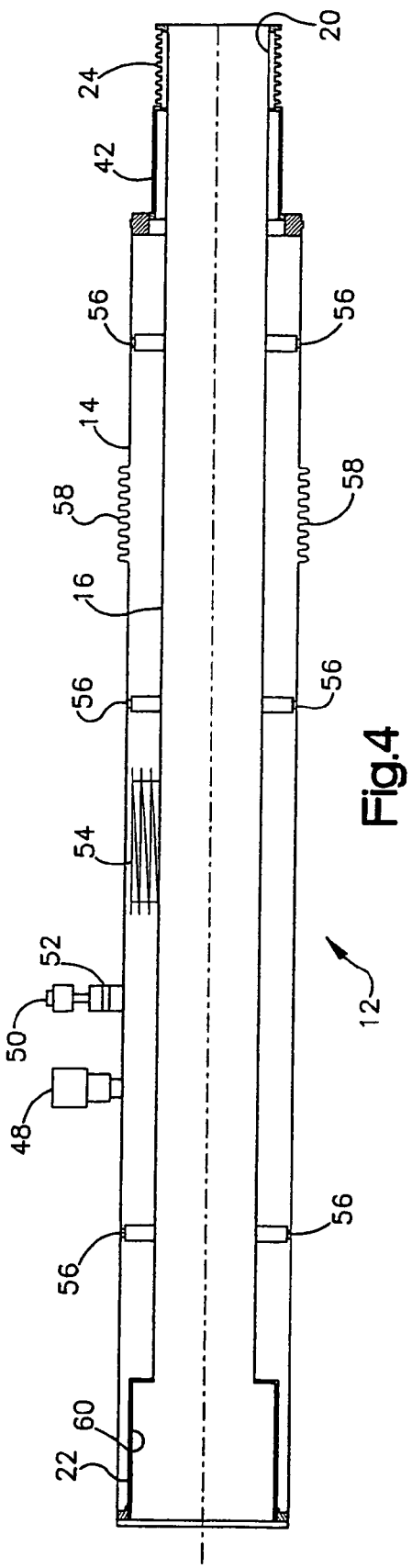
FIG. 4 is a schematic sectional view of the pipe spool of FIGS. 2 and 3 featuring the male bayonet end.

FIG. 4 is a schematic illustrative view of a single pipe spool 12 and is used in connection with the coupled, aligned pipe spools 12 to form the cryogenic, coupled pipe spool system 10. The pipe spool 12 includes a pump-out valve or port 48 to achieve vacuum insulation after coupling, a thermocouple gauge tube 50 to read the vacuum level of each pipe spool 12, and an isolation valve 52. The pipe spool 12 includes, preferably, insulation 54 about the inner pipe 16. Low conductive pipe spacers 56 are positioned longitudinally along the vacuum space 32. The pipe spool 12 includes an external, expansion-contraction metal bellows 58 in the outer pipe 14.

With a bellows 24 in the nose of the male bayonet 20, it will be under external pressure when the internal pipe 16 is pressurized. As a result, the bellows 24 can operate at a higher pressure than it could if it was under internal pressure, which would be the case if the bellows 24 were on the female bayonet 22. As illustrated in FIG. 3, the bellows 24 is captured between the outside of the inner pipe 16 and the inside of the outer pipe 14 of the female bayonet 22. This configuration will guide the bellows 24 and eliminate the possibility of squirm or undesired movement. Each vacuum-insulated section of pipe spool 12 is supplied with a bellows 24 in the male bayonet 20 and a female bayonet 22 at the opposite end. When connected in the field with other vacuum-insulated pipe spools 12, the thermal stress will be no greater than that contained within each pipe spool 12. This eliminates the requirement for a finite element analysis on the piping system.

The location of the bellows 24 on the outside surface of the male bayonet 20 maintains the inner pipe 16 smooth, which reduces the pressure or friction losses in the pipe when transferring fluids. This design eliminates the requirement for expansion loops, further reducing the fluid flow friction and the amount of pipe and fitting required. Incorporating the bellows 24 in the male bayonet 20 allows for easy cleaning of the inner pipe 16 and bellows 24 before field assembly. Incorporating the bellows 24 in the male bayonet 20 eliminates collecting dirt or other particles in the convolutions of the bellows 24 that could be hazardous or cause bellows 24 damage during thermal cycling.

Each fabricated pipe spool 12 can have a male bayonet 20 with bellows 24 at one end and a female bayonet 22, male bayonet 20 without bellows 24, standoff ring closure with a fillet, groove, or butt weld connection 26, or standoff ring closure with flange connection 28 at the other end. The pipe spool 12 end connection opposite the male bayonet 20 with the bellows 24 can have a bend in the end just prior to the fixed male or female bayonet 20 or 22, without adding additional flexibility or bellows 24 to the pipe.

Pipe spool assemblies can run long distances in one direction and will permit a change in direction of up to about 90 degrees, without concern for thermal stresses building up in the piping.

The male and female bayonets 20 and 22 are designed to mate with a high tolerance fit when connected. The male and female bayonets 20 and 22 may also be tapered by the same angle of taper and connected together with a near zero tolerance fit when connected.

The shop-fabricated pipe spools 12 will be delivered to the field with a permanent static vacuum and connected by flanged joints 28, clamped joints 30, or welded joints 26 (see FIGS. 1A through 1C). Elastomeric "O-rings" are required for the flanged and clamped joints 28 and 30 to achieve the pressure seal for the cryogenic fluid. The welded joint 26 will not require "O-rings" because welding seals the piping.

The inner pipe 16 material is preferably stainless steel or another compatible material with cryogenic fluid, and the material of the outer pipe 14 is selected based on the atmospheric environment where it will be installed. This material can be, for example, aluminum, stainless steel or carbon steel with a proper outer coating to eliminate or reduce corrosion. The piping can be used underground, aboveground, and underwater for the transport of cryogenic fluids. The outer pipe 14 design can be modified to meet the pressure and environmental requirements of being placed underground or underwater.

When the pipe of FIG. 4 is placed underground, a vertically-oriented open pipe is located above each pump-out valve 48 location and is capped above grade to provide access for evacuation and monitoring. Vacuum-insulated piping installed underwater is maintained in position with ballast anchors around the pipe to secure the pipe to the sealed. Pump out ports are sealed with a cover of seawater-compatible material and act-as a rupture disc if the pump-out valve 48 relief device is activated. The relief device also incorporates a check valve that will close when the relieving is stopped, to prevent seawater from entering the annular space. The underwater piping may also be provided with a vertically-oriented tube centered over the pump-out valve 48, which is seal-welded to the pipe and extends above the water at high tide, and that is capped to prevent seawater from entering into the vertical tube.

With reference to FIG. 3, one end of the bellows 24 of the male bayonet is welded to an end flange or movable bellows ring 34 which is also welded to the inner pipe 16. The end flange 34 is larger in diameter than the bellows 24 to protect the bellows 24 from damage during handling and installation into the female bayonet 22. The outside diameter of the end flange is rounded or tapered to help guide and align the male bayonet 20 into the female bayonet 22.

With reference to FIG. 4, each factory-fabricated pipe spool having a male bayonet 20 at one end and a female bayonet 22 at the other opposite end can be insulated with multi-layer insulation 54 wrapped around the inner pipe 16. A vacuum in the annular space is achieved using the pump-out valve 48 welded to the outer pipe 14. Provisions can be provided to read the vacuum level of each pipe spool 12 by a thermocouple gauge tube 50 that can be isolated from the vacuum space 32 by a valve 52. The inner pipe 16 is supported along the length by low thermal conductive pipe spacers 56. These pipe spacers 56 are attached to the inner pipe 16 and extended to the inside diameter of the outer pipe 14. The pipe spacers 56 slide or roll along the outer pipe 14.

As illustrated in FIG. 4, an outer pipe bellows 58 may be added to one of the pipe spools 12 of the coupled system between two fixed supports. This outer pipe bellows 58 allows the outer pipe 14 to shrink and expand under environmental temperature changes, i.e., from summer to winter conditions and daytime to nighttime conditions. The outer pipe bellows 58 also allows the outer pipe 14 to shrink upon the loss of vacuum of any pipe spool 12 between the fixed support points. Pipe spacers 56, located on either side of the outer pipe bellows 58, maintain axial alignment of the bellows 58. Standard pipe supports allow the outer pipe 14 to move axially.

In accordance with the invention, a cryogenic seal is added to the piping system of FIGS. 1-4 to prevent catastrophic failure of the cryogenic fluid piping system due to the leakage of cryogenic material from the inner pipe. The cryogenic seal regulates or restricts the leakage rate of cryogenic material from a ruptured bellows 24.

Figure 5A:
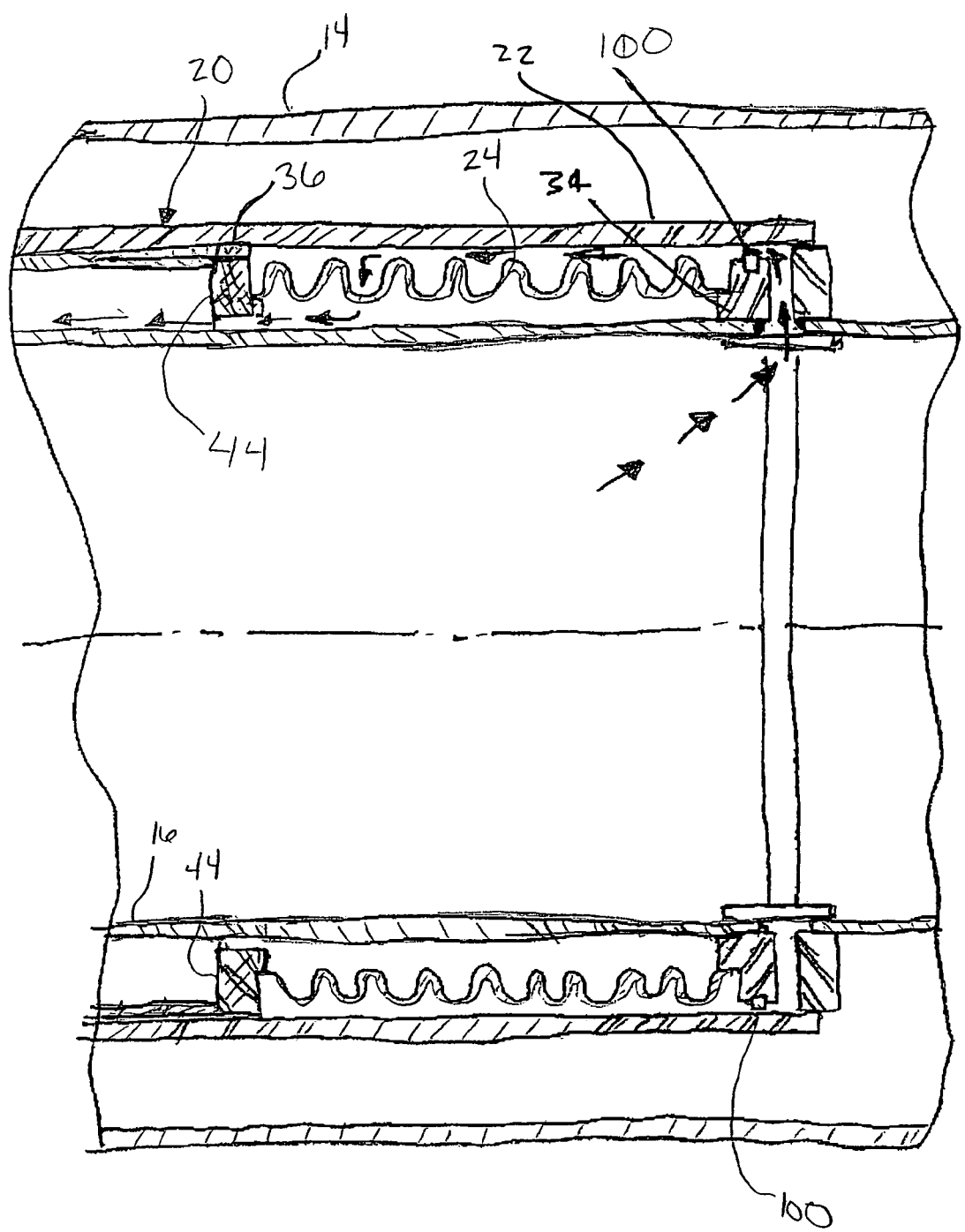
FIGS. 5A and 5B are close up views of failure conditions of pipes incorporating first and second embodiments of the seal of the present invention, respectively.
Figure 5B:
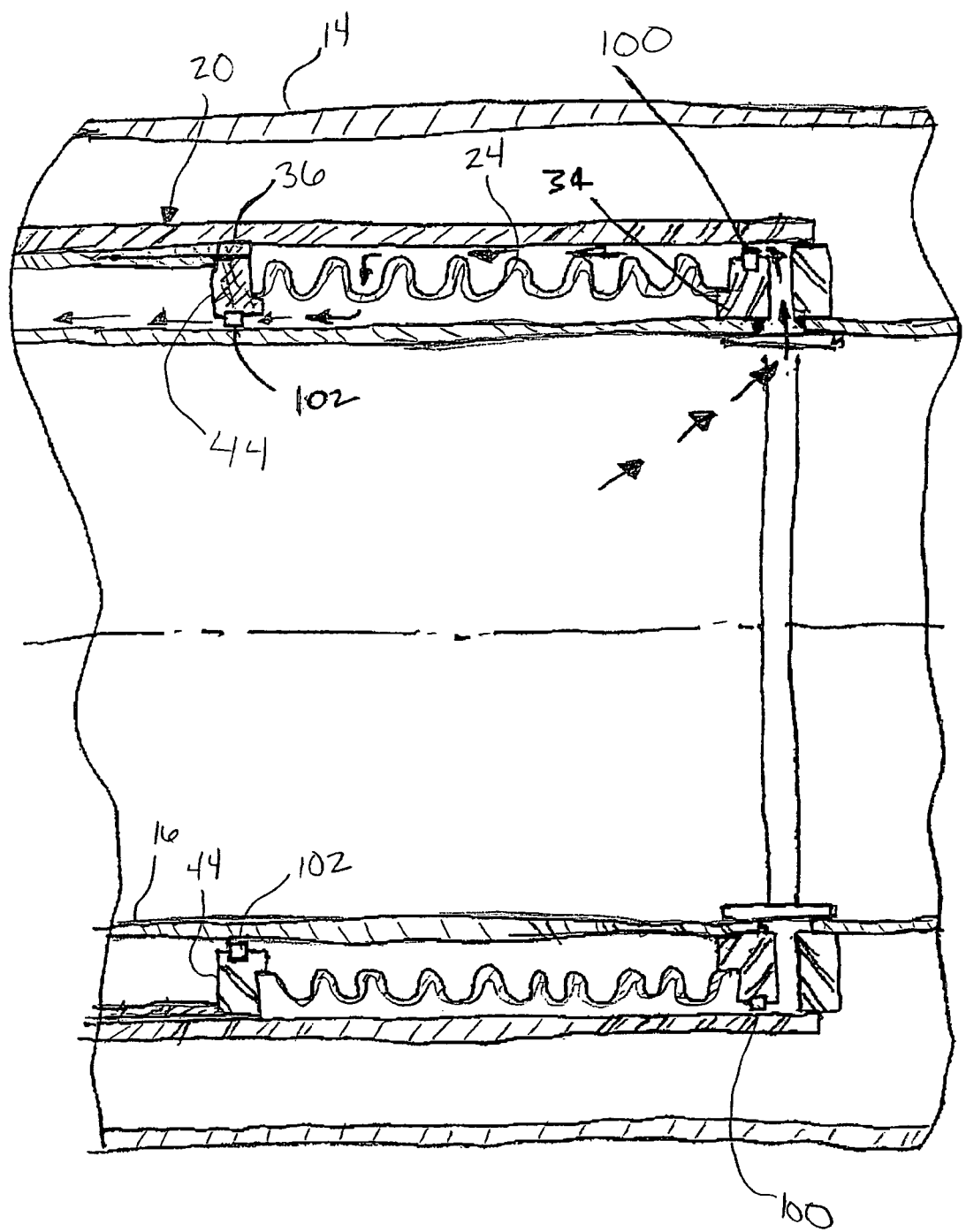

First and second embodiments of the cryogenic seal of the present invention are shown in FIGS. 5A and 5B, respectively. As illustrated in FIGS. 5A and 5B, cryogenic fluid may migrate, during normal operation, to the exterior side of the expansion-contraction bellows 24. The interior side of the expansion-contraction bellows 24 is at a vacuum condition similar to the space between the inner pipe 16 and outer pipe 14. In a failure condition, however, the expansion-contraction bellows 24 may rupture. In such a situation cryogenic fluid may leak from the exterior side to the interior side of the bellows 24. When leakage does occur, it is desirable to minimize the amount of leakage in order to both prevent significant loss of product as well as to minimize the risk of escaping cryogenic fluid or creating a high pressure condition within the fluid piping system. A high pressure condition may lead to further failures of the system.

In the first embodiment shown in FIG. 5A, a leak control ring 100 is placed between the flange or movable bellows ring 34 and the wall of the female bayonet 22, which serves as a bellows guide. The movable bellows ring 34 may be indented to accept the leak control ring 100.

In the second embodiment shown in FIG. 5B, an additional leak control ring 102 is placed around the inner pipe 16 of the male bayonet 20. The leak control ring 102 can be placed to circumscribe the inner pipe 16 in a position beneath the fixed bellows ring 44. The fixed bellows ring 44 may be indented to accept the leak control ring 102. The fit between the leak control ring 102 and the fixed bellows ring 44 can be sufficiently loose to allow evacuation of the interior side of the bellows 24 during normal operation, and to allow controlled leakage of cryogenic material during a failure condition.

The leak control rings 100, 102 may be made of a fluorocarbon polymer, for example TEFLON. Alternatively, the leak control rings 100, 102 may be made of any other suitable material. The leak control rings 100, 102 may have any suitable dimensions. For example, the leak control rings 100, 102 can have a width of approximately 1 inch and a thickness of approximately ¼ inch. Additionally, the leak control ring 100 or rings 100, 102 may be used as means to restrict the leakage rate from other types of joints used to connect the inner pipes of adjacent pipe spools as well. These joints include welded joints and flanged joints.

As illustrated in FIG. 6, a pressure relief valve is preferably attached to the outer pipe 14 to prevent extreme pressure conditions within the space between the inner pipe and outer pipe. During a failure condition involving a ruptured bellows 24, some cryogenic fluid may migrate through the bellows 24 and past the leak control ring 100 or leak control rings 100, 102 and into the space between the inner pipe 16 and the outer pipe 14. It is likely that if the cryogenic fluid was a liquid within the inner pipe, it will vaporize once it leaves the confines of the inner pipe 16. As this vaporization is occurring within the space between the inner pipe 16 and outer pipe 14, the vacuum within this space will be lost and positive pressure generated. Also, the escaped cryogenic fluid may significantly cool the temperature of the outside pipe 14. If there is no means to release the positive pressure generated, further failure of the fluid piping system is likely. In attempt to prevent this failure condition, a pressure relief valve 80 may be added to the outer pipe 14. The pressure relief valve 80 is opened when pressure within the outer pipe exceeds a set threshold. This threshold may be, for example, approximately 10 psig.

Figure 7:
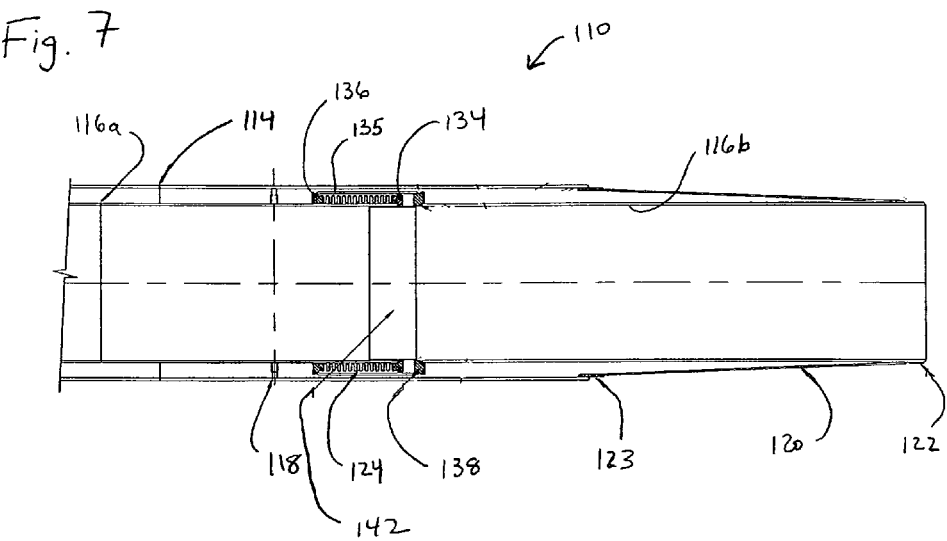
FIG. 7 is a sectional view of a portion of a pipe spool incorporating a third embodiment of the seal of the present invention.

A portion of a vacuum-insulated pipe incorporating a third embodiment of the cryogenic seal of the present invention is indicated in general at 110 in FIG. 7. The pipe features an outer pipe 114 and an inner pipe with sections 116a and 116b. The inner pipe section 116a is positioned within the outer pipe 114 via guide pins 118. A tapered cone 120 is connected between the inner pipe section 116b and outer pipe via inner cone splicing ring 122 and outer cone splicing ring 123.

Figure 8:
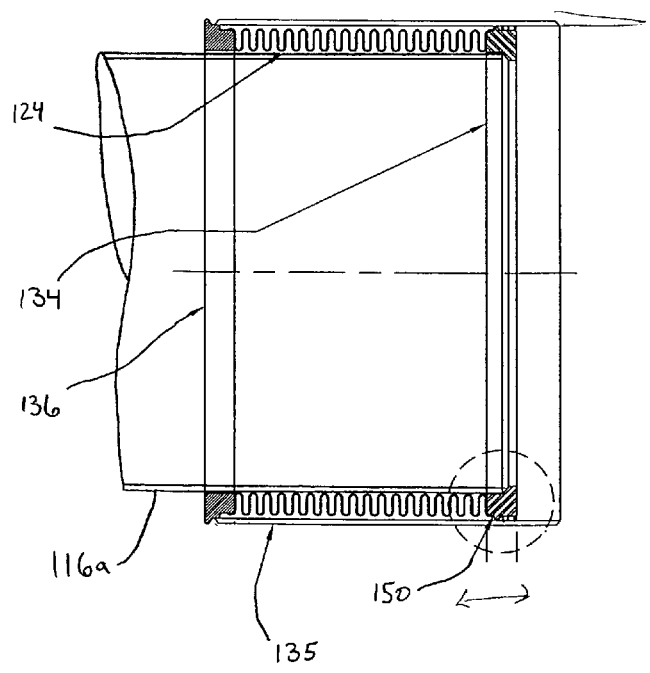
FIG. 8 is an enlarged view of the bellows portion of the pipe spool of FIG. 7.

As illustrated in FIGS. 7 and 8, a bellows 124 is secured to inner pipe section 116a on one end by movable bellows ring 134. The opposite end of bellows 124 is secured to a bellows guide 135 via first fixed bellows ring 136.

As illustrated in FIG. 7, an inner piper section 116b is secured to bellows guide 135 by second fixed bellows ring 138. A bellows shield 142 is also attached to the second fixed bellows ring 138 and smoothes the flow of liquid between inner pipe section 116a and 116b. The bellows shield 142 is not connected to the movable bellows ring 134.

Pipe sections 116a and 116b, bellows 124, movable bellows ring 134, bellows guide 135, first and second fixed bellows rings 136 and 138 and bellows shield 142 are all preferably constructed from steel or some other metallic material and may be secured together in the manner described above by welding.

Figure 9:
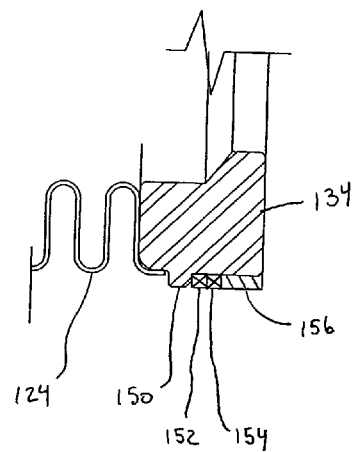
FIG. 9 is an enlarged view of the movable bellows ring and cryogenic seal of FIG. 8.

As illustrated in FIGS. 8 and 9, movable bellows ring 134 is provided with the third embodiment of the cryogenic seal of the present invention. In accordance with the third embodiment, the movable bellows ring 134 is provided with a circumferential ridge 150. As illustrated in FIG. 9, adjacent to the ridge is seal packing 152 and 154 installed in a gland. Packing 152 and 154 are preferably commercially available graphite and carbon based compression packing. An example is 1585 graphite impregnated interwoven carbon fiber packing. Alternatively, the packing material may be another material such as 5000 m flexible graphite. While two layers of packing are illustrated, additional or fewer layers of packing material may be present. The packed gland seal has a retaining ring 156 that confines and compresses the packing within the gland. The ring 156 is preferably constructed from steel.

The packed gland seal restricts the flow of cryogenic liquid, such as LNG, from the inner pipe sections 116a and 116b into the insulating vacuum annuls between the inner and outer pipes in the event of the failure of bellows 124. The pressurized cryogenic liquid in the inner pipe must flow past the packed gland seal before it can reach and pass through the failure point of the bellows 124.

The compression packing conforms to and fills in geometric and surface defects and therefore does not require close tolerances to effect a seal. The unique thermal expansion properties of the graphite and carbon packing at cryogenic temperatures, avoids the thermal contraction problems associated with traditional cryogenic seal materials such as TEFLON and other elastomers (although they could still be used as packing 152 and/or 154). The lubricating properties of the graphite and carbon packing allows the packed seal to slide with the movable bellows ring 134 as the inner pipe sections 116a and 116b contract and the bellows 124 compresses. The location of the seal on the movable bellows ring 134 isolates the bellows 124 from the cryogenic liquid flowing through inner pipe sections 116a and 116b and thus protects the bellows from pressure surges in the carrier/inner pipe.

With reference to FIG. 7, an alternative location for the packed gland seal is between the inner diameter of the first fixed bellows ring 136 and the outer surface of inner pipe section 116a. A suitable circumferential groove would have to be formed in the inner diameter of the first fixed bellows ring 136 in such an embodiment. An additional alternative location for packed gland seal is between the outer surface of the bellows shield 142 and the inner diameter of the movable bellows ring 134. A suitable circumferential groove would have to be formed in the inner diameter of the movable bellows ring 134 in such an embodiment. Any combination of the seal locations may also be used.

It should be understood that the pipe of FIGS. 7-9 may alternatively be equipped with the embodiment of the seals of FIGS. 5A and 5B, including rings 100 and/or 102. Conversely, the piping of FIGS. 5A and 5B could be provided with the embodiment of the seal of FIGS. 7-9.

While the preferred embodiments of the invention have been shown and described, it will be apparent to those skilled in the art that changes and modifications may be made therein without departing from the spirit of the invention, the scope of which is defined by the appended claims.

What is claimed is:

1. A piping system for carrying a liquid comprising:
   a. an inner pipe through which the liquid flows;
   b. an outer pipe at least partially surrounding the inner pipe;
   c. a bellows having a first end and a second end positioned between the inner and outer pipe;
   d. a movable bellows ring connecting the first end of the bellows to the inner pipe;
   e. a first fixed bellows ring connecting the second end of the bellows to the outer pipe;
   f. a bellows guide featuring a first end connected to the first fixed bellows ring and receiving the movable bellows ring in a sliding fashion, said bellows guide also featuring a second end;
   g. a second fixed bellows ring connecting the second end of the bellows guide to the outer pipe;
   h. a bellows shield connected to the second fixed bellows ring, said bellows shield engaging the moveable bellows ring in a sliding fashion; and
   i. a seal positioned between the inner pipe and the bellows guide so that liquid leaked from the inner pipe does not travel out from between the bellows guide and the inner pipe into an annular space between the inner pipe and the outer pipe, said seal also being positioned between the moveable bellows ring and the bellows shield.

2. The piping system of claim 1 wherein the second fixed bellows ring connects the second end of the bellows guide to the outer pipe via a tapered cone.

3. The piping system of claim 1 further comprising a bellows shield connected to the second fixed bellows ring, said bellows shield engaging the movable bellows ring in a sliding fashion.

4. The piping system of claim 1 wherein the seal is leak control ring.

5. The piping system of claim 1 wherein the seal features at least one packing layer.

6. The piping system of claim 1 further comprising:
   j. a male bayonet connector including the bellows, the movable bellows ring and the first fixed bellows ring; and
   k. a female bayonet connector including the bellows guide.

7. The piping system of claim 1 wherein the seal includes a leak control ring.

8. The piping system of claim 1 wherein the seal includes at least one packing layer.

9. The piping system of claim 8 wherein the at least one packing layer includes a graphite material.

10. The piping system of claim 8 further comprising a retaining ring positioned on the first fixed bellows ring and adjacent to the at least one packing layer.

11. A piping system for carrying a liquid comprising:
   a. an inner pipe through which the liquid flows;
   b. an outer pipe at least partially surrounding the inner pipe;
   c. a bellows having a first end and a second end positioned between the inner and outer pipe;
   d. a movable bellows ring connecting the first end of the bellows to the inner pipe;
   e. a first fixed bellows ring connecting the second end of the bellows to the outer pipe;
   f. a bellows guide featuring a first end connected to the first fixed bellows ring and receiving the movable bellows ring in a sliding fashion; and
   g. a seal positioned between the inner pipe and the bellows guide so that liquid leaked from the inner pipe does not travel out from between the bellows guide and the inner pipe into an annular space between the inner pipe and the outer pipe, said seal also being positioned between the moveable bellows ring and the bellows guide and including at least one packing layer; and h. a retaining ring positioned on the movable bellows ring and adjacent to the at least one packing layer.

12. The piping system of claim 11 wherein the seal includes a leak control ring.

13. The piping system of claim 11 wherein the at least one packing layer includes a graphite material.

14. A piping system for carrying a liquid comprising:

a. an inner pipe through which the liquid flows;

b. an outer pipe at least partially surrounding the inner pipe;

c. a bellows having a first end and a second end positioned between the inner and outer pipe;

d. a movable bellows ring connecting the first end of the bellows to the inner pipe;

e. a first fixed bellows ring connecting the second end of the bellows to the outer pipe;

f. a bellows guide featuring a first end connected to the first fixed bellows ring and receiving the movable bellows ring in a sliding fashion;

g. a first seal positioned between the inner pipe and the bellows guide so that liquid leaked from the inner pipe does not travel out from between the bellows guide and the inner pipe into an annular space between the inner pipe and the outer pipe, said first seal also being positioned between the movable bellows ring and the bellows guide; and h. a second seal positioned between the first fixed bellows ring and an outer surface of the inner pipe.

* * * * *